G. WESTINGHOUSE, Jr.

Steam-Power Brake Devices.

No. 5,504. Reissued July 29, 1873.

WITNESSES
James L. Kay
R. E. Henderson

INVENTOR
George Westinghouse Jr.
by Bakewell, Christy & Harr,
his Attys.

THE NORRIS PETERS CO., PHOTO-LITHO., WASHINGTON, D. C.

UNITED STATES PATENT OFFICE.

GEORGE WESTINGHOUSE, JR., OF PITTSBURG, PENNSYLVANIA.

IMPROVEMENT IN STEAM-POWER BRAKE DEVICES.

Specification forming part of Letters Patent No. 88,929, dated April 13, 1869; reissue No. 5,504, dated July 29, 1873; application filed May 26, 1873.

*To all whom it may concern:*

Be it known that I, GEORGE WESTINGHOUSE, Jr., of Pittsburg, in the county of Allegheny and State of Pennsylvania, have invented a new and useful Improvement in Steam-Power Brake Devices; and I do hereby declare the following to be a full, clear, and exact description thereof, reference being had to the accompanying drawing, making a part of this specification, in which—

Figure 1:
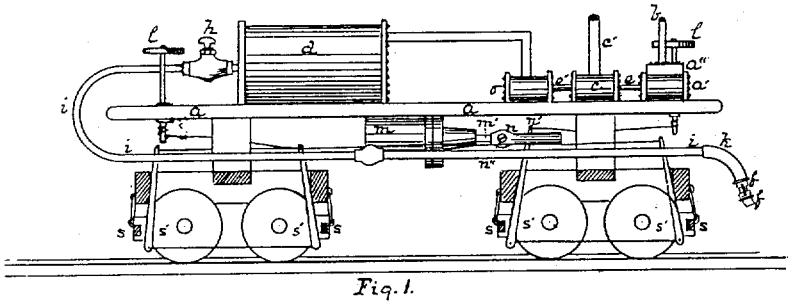
Figure 2:
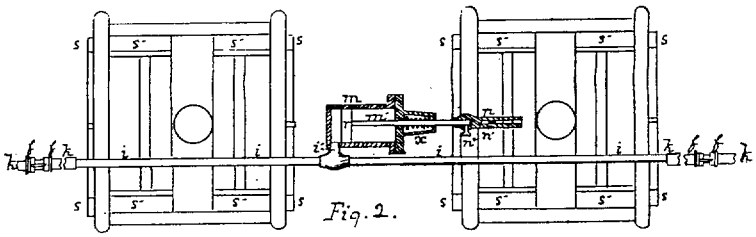
Figure 6:
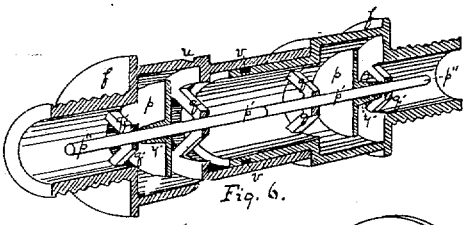
Figure 3:
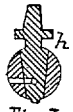
Figure 4:
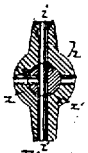
Figure 5:
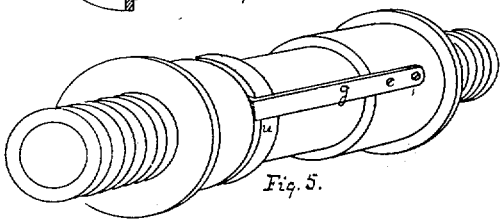

Figure 1 shows, by a side elevation, partly in section, my improvement as mounted on and applied to an ordinary platform-car. Fig. 2 is a sectional plan view, as formed by a horizontal plane passing through the brake-cylinder, just below the body of the car. Fig. 3 is a vertical, and Fig. 4 is a cross, section of the three-way cock, by which I admit or cut off the supply of air to the brake. Fig. 5 is an outside perspective view; and Fig. 6 is a longitudinal section in perspective of my improved coupling for uniting the brake-pipes of contiguous cars.

Like letters of reference indicate like parts in each.

My invention relates to the construction of a power car-brake for railway cars or other like vehicles, to be operated by compressed air or other elastic compressible fluid; and the nature of it consists in combining the elements of a system of car-brake apparatus, and in the construction of devices forming a part of the same, substantially as hereinafter set forth and claimed.

To enable others skilled in the art to make and use my invention, I will proceed to describe its construction and manner of use.

In Figure 1 of the drawings, *a* represents a platform-car, on which is mounted an auxiliary engine, *a′ a″*, a feed-water-pumping cylinder, *c*, an air-pump, *o*, and an air-reservoir, *d*. A single piston-rod connection, *e e′*, may answer for both pumps, or one piston-rod may lead from the cylinder *a′* of the auxiliary engine to the feed-water pump *c*, and another to the air-pump *o*. In either case the operation would be the same. *b* is a steam-pipe leading from the locomotive-boiler to the auxiliary engine *a′ a″*. A water-pipe extends from the water-tank on the tender to the pumping-cylinder *c*, and, by a piston working therein, water is fed through the pipe *c′* to the boiler. The air-pump *o* has the usual valves, and works on the principle of the ordinary air-pump and compresses the air into the reservoir *d*. Each of these cylinders is fitted with the valves and cocks necessary to its successful operation. From the reservoir *d* an air-pipe, *i*, leads along under the cars of the train, the communication through the pipe from the reservoir being opened and closed by a three-way cock, *h*, presently to be described. At any convenient point on or under each car of the train a brake-cylinder, *m*, is attached, having a piston, *r*, working closely therein. A branch pipe, *i′*, leads from the main pipe *i* to each brake-cylinder *m* opening into it back of the piston *r*. The piston-stem *m′* plays through the opposite end of the brake-cylinder *m*, and, at its outer end, may be bifurcated so as to operate against the brake-lever *n′*, or an adjustable bifurcated stem, *n*, may be set thereon by a set-screw, *n″*. The brake-lever *n′* and the brakes connected therewith may be simple or compound; or of any known or desirable construction. As shown, they are of the ordinary style.

It will be observed that, with the construction and arrangement shown, the operation of the doctor or feed-water pump and of the brakes is in no way dependent on the movements of the locomotive. If steam be up water can be fed into the boiler even when the locomotive is standing, which end is desirable, since it sometimes is far from convenient to run a locomotive forward or backward merely to replenish the supply of water in the boiler, and still more so, at other times, to slack up a train for the same purpose.

In like manner the operation of the auxiliary engine *a′ a″* may be so regulated, even with the locomotive running at its highest speed, and with an occassional or even frequent application of the brakes, that a uniformly constant pressure of air can be preserved in the reservoir *d*. This auxiliary engine *a′ a″*, with the pumps *c o* and reservoir *d*, may, and probably should, be, for convenience, mounted on or attached in some way to the locomotive or tender. As they are small, and light, and not costly, they can be easily and cheaply applied.

If it be desired to operate either alone, the connecting-valves of the other may be closed and its piston worked *in vacuo* without in the least interfering with the working of the other. The reservoir *d* being filled with compressed air, whenever it is desirable to apply the brakes the cock *h* is turned, and the air rushes along through the pipes *i i'* into the brake-cylinder *m*, forces the rod *m'* or the stem *n* against the brake-lever *n'*, whereby the brakes *s* are instantaneously applied to the wheels *s'* and the speed of the train at once checked. Of course, the more the air is compressed in the reservoir *d* the more powerful will be its action on the brakes. The cock *h* is a three-way cock—that is, it opens on the three sides. When turned as in Fig. 4 the air flows freely through from the reservoir *d*, as described. On being turned one-quarter way around the orifice *z* comes into the tubular opening of the pipe *i* leading to the brake-cylinder, and the orifice *z'* coincides with the orifice in the side of the valve-seat, so that communication is cut off from the reservoir *d* to the brakes, but opened from the brake-cylinders to the external atmosphere. The excess of air then escapes. The spiral spring *x*, Fig. 2, carries the piston *r* of the brake-cylinder *m'* back to the head of the brake-cylinder, and the brakes are off.

The length of the throw to be given to the brake-lever *n'* may sometimes vary somewhat; and, hence, I use the adjustable stem *n*.

The bifurcation in which the lever *n'* works, whether made in the adjustable stem *n* or in the piston-stem *m'*, is of such depth that if it be sometimes preferred to operate the brakes by hand the levers *n'* will not be drawn out of the fork or slot of the bifurcated end; and to illustrate such use I have shown the ordinary hand-brakes *l* attached.

To provide for longitudinal motion of the cars independent of each other in starting or stopping, I use, between each two cars, a section of air-tight flexible pipe, *k*, made of India rubber, or India rubber and cloth, or other like flexible and air-tight material.

An important feature of my invention consists of the construction and combination of valves, which I use in the couplings *f f* of the pipes *k*, where they are jointed between the cars. These valves are more perfectly illustrated in Fig. 6, where *f f* represent the adjacent couplings of the pipes *k* of two consecutive cars. The couplings *f* couple one into the other with suitable packing-rings *v* and spring-hooks *g* (preferably on opposite sides) attached to one-half coupling engage the beveled shoulders *n* in the face of the other coupling *f* and prevent their coming uncoupled, except in case the car-coupling should break, and then the hooks *g* would be disengaged and the couplings be uncoupled without injury to any part thereof. Inside each coupling *f* is a puppet-valve, *p*, having a stem, *p'*, playing through a guide or diaphtagm, *c*, the two stems being of such length that when the couplings *f* are coupled together the stems will come together, end to end, and each force back the other, so as to throw its valve *p* free from its seat, and make an uninterrupted communication through the pipe *i* from the reservoir *d* to the last valve of the last car. The rear stems *p''* play through guides or diaphragms *q'* and keep the valves *p* more accurately centered, so that the forward stems *p'* will always engage each other when the cars are coupled. The guides *q q'* should be open, or have openings, to admit of the passage, from one pipe to the next, of the compressed air; then, when the pipes are uncoupled, by the breaking of a car-coupling or otherwise, the compressed air having been applied to the brakes, its pressure will cause the valves *p* to come against their seats, thereby closing the ends of the pipe and keeping the brakes on or down. Thus the danger from accident will be materially decreased. The stems *p''* are made with shoulders *y'*, which rest against the guides *q'* when the couplings *f* are coupled and the valves *p* are opened; consequently the valves *p* cannot set back against the guides *q'* to close them, nor can the compressed air, when admitted, close the valves *p*, or either of them. When the pipes are coupled the valves *p* must always be open. If they come uncoupled when filled with compressed air they will be instantly closed, and must necessarily remain so. Hence, in the worst of disasters, the brakes will remain down if once applied. Instead of the puppet-valve *p* other forms of valves may be used, provided they be so arranged as to operate or open each other when the couplings *f* are coupled together. For this purpose flap-valves with stems may be used. Also, instead of the diaphragms for guiding the stems, wings on the stems may be substituted. In that case the wings may be so made as to slide in the cylindrical or other shaped cavity of the couplings *f*.

An improved mode of packing the joints of the male and female parts of the coupling constitutes another part of my invention, and the same is shown in Fig. 6. In a groove in the outer periphery of the male part of the coupling I insert one or more packing-rings, *v*, with the outer face of the same flush, or nearly so, with the periphery of the male part in which it is arranged. The hooks *g* operate with sufficient rigidity to catch tightly in the grooves *u* and hold the couplings *f* together against any ordinary force, exerted longitudinally, to which they would be subject. But by beveling slightly the holding-shoulders of the grooves *u*, as shown, the hook *g* would be disengaged, as in case of an accident, by any force sufficient to throw the car from the track, or by the breaking of the car-coupling. In lieu of this device, however, other devices performing the same function may be substituted—that is, other means may be used to accomplish the end, provided they be such as will hold the couplings *f* together against the operation of any force to which, in use, they are ordinarily subject; but not such as to prevent their being automatically uncoupled in case of accident. At the same time, all such devices should be so made that the couplings my be readily uncoupled by hand.

The particular advantages connected with the apparatus described, in addition to those above referred to, are that the brakes are under the control of the engineer, and can be instantaneously applied at any time and with any degree of power within the strength of the machinery employed, and the brakes can be as instantaneously released. They are simple in construction, cheaply made, can be applied to and used in connection with, or used without, the ordinary hand-brakes.

By the use of the auxiliary engine, the operation of the brakes is made independent of the operation of the locomotive, so that much or little power can be stored up in the reservoir *d* at any time, whether the locomotive be running fast or slow, or not at all; and, if desired, all the force of the air-pump can be applied to the brakes over and above the force that can be stored up in the reservoir.

By this mode of operating brakes, in connection with the couplings described, in case of accident, the brakes may be instantaneously applied and kept "on" till the whole train or each separate car, if the car-couplings break, be brought to a complete stand.

What I claim as my invention, and desire to secure by Letters Patent, is—

1. The combination of a brake, operating on the wheels of a railway locomotive, car, or truck, with an air-reservoir, an independent steam-pump, operated by steam from the locomotive-boiler, for charging the same, and a brake-cylinder, connected with the reservoir by suitable pipe or pipes, furnished with cocks for charging, discharging, and graduating the pressure in the brake-cylinder.

2. The combination of a brake, operating on the wheels of a railway locomotive, car, or truck, with an air-reservoir, an independent steam-pump, operated by steam from the locomotive-boiler for charging the same, a brake-cylinder, connected with the reservoir by suitable pipe or pipes, furnished with cocks for charging, discharging, and graduating the pressure in the brake-cylinder, and flexible extension pipes for connecting between cars and coupling, which, when subjected to unusual strain, are self-detaching.

3. The combination of a brake, operating on the wheels of a railway locomotive, car, or truck, with an air-reservoir, an independent steam-pump, operated by steam from the locomotive boiler, for charging the same, a brake-cylinder, connected with the reservoir by suitable pipe or pipes, furnished with cocks for charging, discharging, and graduating the pressure in the brake-cylinder, and a pipe or pipes extending from end to end of the car, and furnished between cars with valves which close automatically when the pipes are uncoupled.

4. Valves arranged in the adjacent ends of the coupling *f*, and guided by stems and guides, so as to open each other when the couplings *f* are united, and to close automatically when uncoupled, substantially as above set forth.

5. In atmospheric car-brake apparatus, the couplings for connecting the ends of the air-pipes between the cars, when attached to such pipes by flexible connections, substantially as hereinbefore described, whereby they become automatically detached when exposed to more than the usual strain.

6. The combination of a car-brake operating on the wheels of a railroad vehicle, with an air-reservoir, a brake-cylinder, a connecting pipe or pipes from the reservoir to the brake-cylinder with flexible extensions for connecting between cars, and automatically detachable couplings on the flexible connecting-pipes, with or without valves, substantially as set forth.

7. The arrangement of the brake-lever in relation to the piston-stem of the brake-cylinder, substantially as described, whereby the brake-lever may be operated by the ordinary hand apparatus, without operating the brake-cylinder, and independently of the power-brake apparatus.

8. An auxiliary engine arranged on a locomotive, so combined with an air-pump and a feed water-pump as to operate them separately or together.

In witness whereof I, the said GEORGE WESTINGHOUSE, Jr., have hereunto set my hand.

GEORGE WESTINGHOUSE, JR.

Witnesses:
T. B. KERR,
J. H. CHRISTY.